United States Patent
Hu et al.

(10) Patent No.: US 11,428,949 B2
(45) Date of Patent: Aug. 30, 2022

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Cheng-Kai Yu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 16/539,660

(22) Filed: Aug. 13, 2019

(65) Prior Publication Data
US 2019/0361264 A1    Nov. 28, 2019

Related U.S. Application Data

(63) Continuation of application No. 15/419,339, filed on Jan. 30, 2017, now Pat. No. 10,423,005.
(Continued)

(30) Foreign Application Priority Data

Nov. 9, 2016 (TW) ................... 105136366

(51) Int. Cl.
  *G02B 27/64*   (2006.01)
  *G02B 7/08*    (2021.01)
  *H02K 41/035*  (2006.01)

(52) U.S. Cl.
  CPC ............ *G02B 27/646* (2013.01); *G02B 7/08* (2013.01); *H02K 41/035* (2013.01); *H02K 41/0356* (2013.01)

(58) Field of Classification Search
  CPC . G02B 7/00; G02B 7/02; G02B 7/021; G02B 7/04; G02B 7/08; G02B 27/64; G02B 27/646; H02K 41/035; H02K 41/0356
(Continued)

(56) References Cited

U.S. PATENT DOCUMENTS 8,218,062 B2 * 7/2012 Tseng ................. H02K 41/0356
                                                348/345
8,982,464 B2 * 3/2015 Chan .......................... G02B 7/04
                                                359/554
(Continued)

FOREIGN PATENT DOCUMENTS

CN    104216199 A    12/2014
CN    204287690 U     4/2015
(Continued)

OTHER PUBLICATIONS

Office Action dated Apr. 10, 2017 in corresponding TW Application No. 105136366, 8 pages.
(Continued)

*Primary Examiner* — Thong Q Nguyen
(74) *Attorney, Agent, or Firm* — Muncy, Geissler, Olds & Lowe, P.C.

(57) ABSTRACT

An optical element driving mechanism is provided, including: a fixed portion; a movable portion movably connected to the fixed portion and includes a frame and a holder, wherein an optical element having an optical axis is connected to the movable portion; a first driving assembly disposed in the fixed portion to move the movable portion relative to the fixed portion; and a resilient element, including: an outer resilient element, including: a first segment having a strip-shaped structure; a second segment having a strip-shaped structure; and a first bending segment, wherein the first segment connects to the second segment through the first bending segment, and the frame is movably connected to the fixed portion through the outer resilient element; and an inner resilient element, wherein the holder is movably connected to the frame through the inner resilient element.

18 Claims, 6 Drawing Sheets

Related U.S. Application Data

(60) Provisional application No. 62/291,311, filed on Feb. 4, 2016.

(58) Field of Classification Search
USPC .................................. 359/554–557, 813–824
See application file for complete search history.

(56) References Cited

U.S. PATENT DOCUMENTS

| | | | |
|---|---|---|---|
| 9,071,743 B2* | 6/2015 | Yeo | G03B 13/34 |
| 9,791,713 B2* | 10/2017 | Park | G02B 7/08 |
| 10,197,813 B2* | 2/2019 | Lee | G02B 7/08 |
| 2010/0080545 A1 | 4/2010 | Fan et al. | |
| 2011/0030368 A1 | 2/2011 | Kume | |
| 2011/0063495 A1* | 3/2011 | Tseng | G02B 7/08 |
| | | | 348/357 |
| 2011/0262122 A1* | 10/2011 | Minamisawa | G03B 5/00 |
| | | | 396/55 |
| 2013/0016428 A1 | 1/2013 | Sugawara et al. | |
| 2013/0039640 A1 | 2/2013 | Sekimoto | |
| 2014/0177056 A1 | 6/2014 | Hayashi et al. | |
| 2014/0327965 A1 | 11/2014 | Chen et al. | |
| 2015/0212291 A1* | 7/2015 | Lee | G02B 7/08 |
| | | | 348/360 |
| 2015/0309282 A1* | 10/2015 | Lee | G03B 3/10 |
| | | | 359/814 |
| 2016/0187668 A1 | 6/2016 | Hayashi | |
| 2018/0136482 A1* | 5/2018 | Kuo | G02B 27/646 |
| 2018/0252893 A1* | 9/2018 | Park | G03B 3/10 |
| 2019/0041602 A1* | 2/2019 | Lee | G02B 5/28 |

FOREIGN PATENT DOCUMENTS

| | | |
|---|---|---|
| JP | 2013122557 A | 6/2013 |
| JP | 2013250299 A | 12/2013 |
| TW | 201523059 A | 6/2015 |
| TW | M504958 U | 7/2015 |
| WO | WO2014083894 A1 | 6/2014 |
| WO | WO2015130051 | 9/2015 |
| WO | WO2015174028 A1 | 11/2015 |
| WO | WO2016006239 A1 | 1/2016 |

OTHER PUBLICATIONS

Office Action issued in corresponding JP application No. 2017-018766 dated Jun. 30, 2020.

* cited by examiner

OPTICAL ELEMENT DRIVING MECHANISM

CROSS REFERENCE TO RELATED APPLICATIONS

This application is a Continuation of application Ser. No. 15/419,339, filed on Jan. 30, 2017, now U.S. Pat. No. 10,423,005, which claims the benefit of Taiwan Patent Application No. 105136366, filed on Nov. 9, 2016 and U.S. Provisional Patent Application No. 62/291,311, filed on Feb. 4, 2016, the entirety of which are incorporated by reference herein.

BACKGROUND

Field of the Invention

The present invention relates to a driving module and a lens driving device using the same, and more particularly to an electromagnetic driving module which converts electrical energy into mechanical energy and a lens driving device using the same.

Description of the Related Art

Some electronic devices are equipped with a driving module to drive an element to move a predetermined distance. For example, a lens driving device in a camera usually includes a driving module to generate motive power. One or more optical lens units of the lens driving device are driven by the motive power to move along a direction perpendicular to an optical axis, so as to facilitate image stabilization.

However, since the driving module includes a complex driving member, such as a stepper motor, ultrasonic motor, piezoelectric actuator, etc. to generate the motive power, and the motive power has to be transmitted by a number of transmission elements, it is not easy to assemble and the manufacturing cost is high. In addition, a conventional driving module is also large in size and has high power consumption due to its complex construction.

On the other hand, in the driving module described above, a movable portion for carrying a lens is usually connected to a fixed portion by a plurality of suspension wires. The suspension wires extend in a direction that is parallel to the optical axis of the lens to facilitate the movement of the movable portion in a direction that is perpendicular to the optical axis with respect to the fixed portion.

However, the arrangement of the suspension wires will be detrimental to the reduction of the thickness of the driving module because the elastic coefficient of the suspension wires in the direction that is perpendicular to the optical axis increases as its length decreases, and the movable portion cannot be stably moved relative to the fixed portion if the length of the suspension wires is reduced.

SUMMARY

In order to address the drawbacks of the prior art, one objective of the disclosure is to provide an electromagnetic driving module that omits the arrangement of the known suspension wires to reduce the thickness of the electromagnetic drive module.

In accordance with some embodiments of the disclosure, the electromagnetic driving assembly includes a fixed portion, a movable portion, an OIS driving assembly and a first flexible assembly. The movable portion is arranged in a main axis with the fixed portion. The OIS driving assembly is configured to drive the movement of the movable portion relative to the fixed portion in a direction that is perpendicular to the main axis. The first flexible assembly is positioned at one side of the movable portion and includes a first outer ring flexible member connecting the movable portion to the fixed portion. The first outer ring flexible member extends in a plane that is perpendicular to the main axis.

In the above-mentioned embodiments, the movable portion includes a lens holder and a frame surrounding the lens holder, and the electromagnetic driving assembly further includes a focusing driving assembly configured to drive the movement of the lens holder relative to the frame in the main axis. In addition, the first flexible assembly includes a first inner ring flexible member connecting the lens holder to the frame.

In the above-mentioned embodiments, in the direction that is perpendicular to the main axis, the width of the first inner ring flexible member is greater than the thickness of the first inner ring flexible member. Additionally, or alternatively, in the direction of main axis, the width of the first outer ring flexible member is smaller than the thickness of the first outer ring flexible member.

In the above-mentioned embodiments, the first inner ring flexible member and the first outer ring flexible member are formed integrally.

In the above-mentioned embodiments, the first flexible assembly includes four first inner ring flexible members separated by the same space in a circumferential direction.

In the above-mentioned embodiments, the first outer ring flexible member includes a plurality of bended structures.

In the above-mentioned embodiments, the electromagnetic driving assembly further includes a second flexible assembly. The second flexible assembly is positioned at the side of the movable portion that is opposite to the side where the first flexible assembly is positioned. The second flexible assembly includes a second inner ring flexible member connecting the lens holder to the frame and a second outer ring flexible member connecting the frame to the fixed portion.

In the above-mentioned embodiments, in the direction that is perpendicular to the main axis, the width of the second inner ring flexible member is greater than the thickness of the second inner ring flexible member. Additionally, or alternatively, in the direction of the main axis, the width of the second outer ring flexible member is less than the thickness of the second outer ring flexible member.

Another objective of the disclosure is to provide a lens driving device including the electromagnetic driving assembly in any one of the above-mentioned embodiments. The lens driving device further includes a lens assembly positioned on the movable portion of the electromagnetic driving assembly. The optical axis of the lens assembly is aligned with the main axis.

BRIEF DESCRIPTION OF THE DRAWINGS

For a more complete understanding of the embodiments and the advantages thereof, reference is now made to the following descriptions taken in conjunction with the accompanying drawings.

DESCRIPTION OF THE ILLUSTRATIVE EMBODIMENTS

Figure 1:
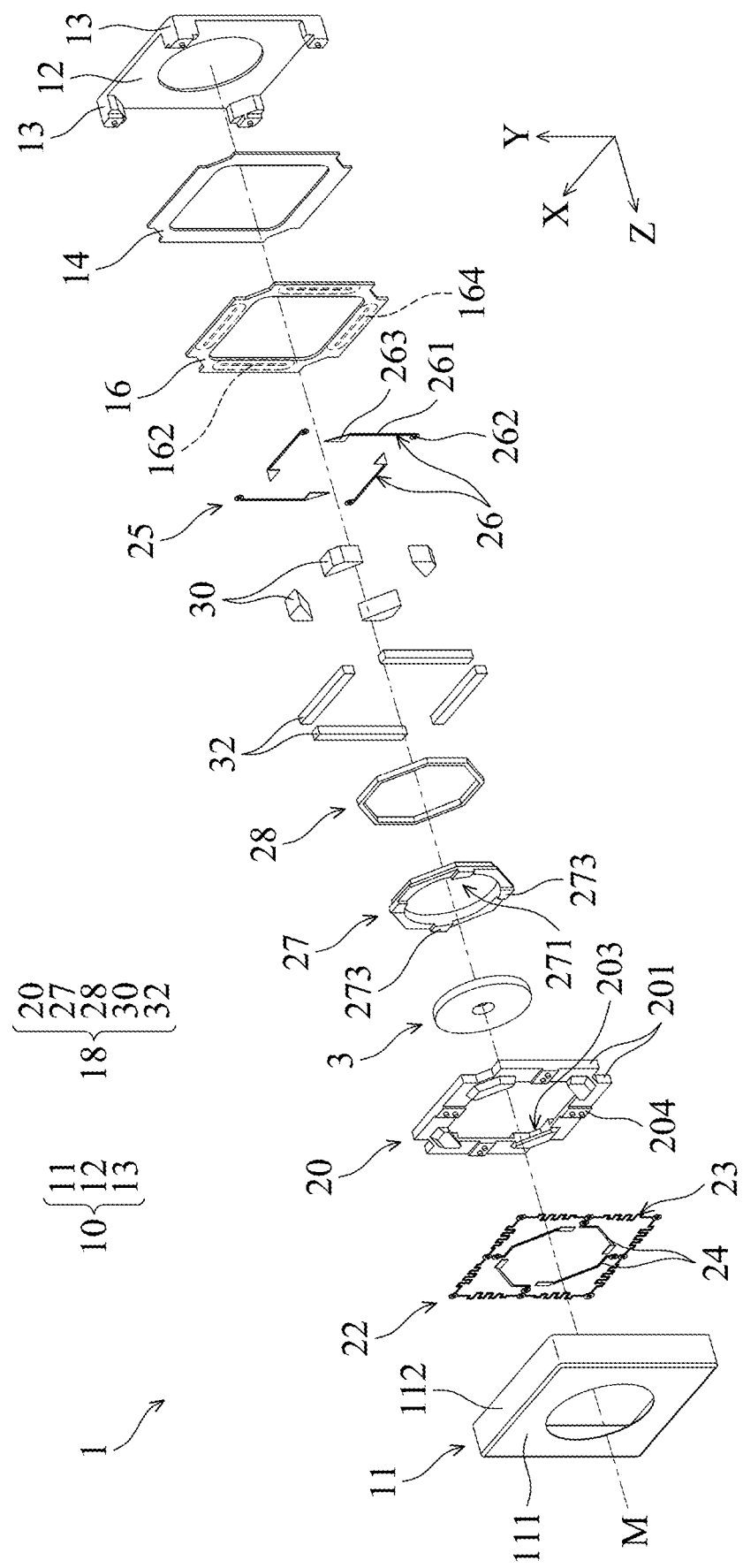
FIG. 1 shows an exploded view of an electromagnetic driving module, in accordance with some embodiments of the disclosure.

In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "an element overlying another element", "an element is disposed above another element", "an element is disposed on another element" and "an element is disposed over another element" may indicate not only that the element directly contacts the other element, but also that the element does not directly contact the other element, there being one or more intermediate elements disposed between the element and the other element.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 shows a schematic view of a lens driving module 1, in accordance with some embodiments. In some embodiments, the lens driving module 1 includes an electromagnetic driving module 2 and a lens assembly 3. The electromagnetic driving module 2 is configured to support the lens assembly 3 and to control the movement of the lens assembly 3.

In some embodiments, the electromagnetic driving module 2 includes a fixed portion 10, a circuit board 14, a coil substrate 16, a movable portion 18, a first flexible assembly 22 and a second flexible assembly 25. The elements of the electromagnetic driving module 2 can be added to or omitted, and the invention should not be limited by the embodiment.

In some embodiments, the fixed portion 10 includes a housing 11, a base 12 and four positioning pillars 13. In some embodiments, the housing 11 includes an upper housing member 111 and a lateral housing member 112. The upper housing member 111 has a rectangular shape. The lateral housing member 112 extends from the edges of the upper housing member 111 toward the base 12. The base 12 has a shape that corresponds to the shape of the upper housing member 111. The base 12 is connected to the housing 11 via the lateral housing member 112. The four positioning pillars 13 are positioned at four corners of the base 12 and configured for positioning the first flexible assembly 22 and/or second flexible assembly 25. The other elements of the electromagnetic driving module 2 may be positioned in a place defined by the fixed portion 10.

The circuit board 14 is positioned on the base 12 and is configured to electrically connect a control module (not shown in figures) to the electric elements of the electromagnetic driving module 2. The coil substrate 16 is positioned on the circuit board 14 and includes a number of OIS (optical image stabilization) driving coils, such as two OIS driving coils 162 and two OIS driving coils 164. The OIS driving coils 162 and 164 are electrically connected to the circuit board 14 and are configured to drive the movement of the movable portion 18 in a direction that is perpendicular to the main axis M. In some embodiments, as shown in FIG. 1, the two OIS driving coils 162 are respectively positioned adjacent to two lateral sides of the base 12 that are arranged along the Y direction. In addition, the two OIS driving coils 164 are respectively positioned adjacent to two lateral sides of the base 12 that are arranged along the X direction.

The movable portion 18 is configured to support the lens assembly 3. In some embodiments, the movable portion 18 includes a frame 20, a lens holder 27, a focusing driving coil 28, a number of focusing magnetic elements, such as four focusing magnetic elements 30 and a number of OIS magnetic elements, such as four OIS magnetic elements 32. The elements of the movable portion 18 can be added to or omitted, and the invention should not be limited by the embodiment.

The frame 20 includes four lateral frame members 201 surrounding the main axis M and connected to one another. The upper surface and/or the lower surface of each lateral frame member 201 may include a positioning platform for facilitating the positioning of the first flexible assembly 22 and the second flexible assembly 25. For example, the upper surface of each of the lateral frame members 201 includes a positioning platform 204 for facilitating the positioning of the first flexible assembly 22. In addition, the frame 20 farther includes four recesses 203. Each recess 203 is formed at the position where the two neighboring lateral frame members 201 are connected to each other. The relationship of the first flexible assembly 22 and the frame 20 is elaborated in the description of FIG. 2.

The lens holder 27 is surrounded by the frame 20, and the lens holder 27 is penetrated by a passage 271 that extends in the main axis M. The lens assembly 3 is disposed in the passage 271. The upper surface and/or the lower surface of the lens holder 27 may include a positioning platform for facilitating the positioning of the first flexible assembly 22 and the second flexible assembly 25. For example, each of the upper surface and the lower surface of the lens holder 27 includes four positioning platforms 273 (only tour positioning platforms 273 formed on the upper surface are shown in FIG. 3) separated by the same space in the circumferential direction. The positioning platforms 273 on the upper surface is configured for positioning the first flexible assembly 22, and the positioning platforms 273 on the lower surface is configured for positioning the second flexible assembly 25. The relationships of the first flexible assembly 22, the second flexible assembly 25 and the lens holder 27 are elaborated in the descriptions of FIG. 2.

The focusing driving coil 28 is positioned at the outer surface of the lens holder 27 and is electrically connected to the circuit board 14 via the first flexible assembly 22 or the second flexible assembly 25. The four focusing magnetic elements 30 are disposed in the recesses 203, and the four OIS magnetic elements 32 are positioned on the bottom surface of the four lateral frame members 201. Being positioned by the frame 20, each of the four focusing magnetic elements 30 faces the corresponding focusing driving coil 28, and each of the four OIS magnetic elements 32 faces the corresponding OIS driving coil 162 or 164.

The four magnetic elements 30 may be magnets. One magnetic pole of each magnetic element 30, such as the N pole, faces the focusing driving coil 28, and the other magnetic pole of each magnetic element 30, such as the S pole, faces the OIS driving coils 162 or 164. The four magnetic elements 30 may be fixed on the recess 203 by any suitable method such as gluing.

In the embodiment, a "focusing driving assembly" for driving the movement of the lens holder 27 relative to the frame 20 is composed by the focusing driving coil 28 and the four focusing magnetic members 30. In addition, an "OIS driving assembly" for driving the movement (e.g. translational movement that is perpendicular to the main axis M) of the movable portion 18 relative to the fixed portion is composed by the OIS driving coils 162 and 164 and the four OIS magnetic members 32.

However, it should be appreciated that while there are four focusing magnetic members 30 and four OIS magnetic members 32, the disclosure should not be limited thereto. In some other embodiments, the OIS magnetic members 32 are omitted, and the four focusing magnetic members 30 are simultaneously positioned corresponding to the focusing driving coils 28 and the OIS driving coils 162 and 164.

The first flexible assembly 22 is connected to the side of the movable portion 18 that is adjacent to the upper housing member 111 and extends on a plane that is perpendicular to the main axis M. The second flexible assembly 25 is connected to the side of the movable portion 18 that is adjacent to the base 13. The first flexible assembly 22 and the second flexible assembly 25 may have the same configuration or different configurations. In addition, the position of the first flexible assembly 22 and the second flexible assembly 25 can be exchanged.

Figure 2:
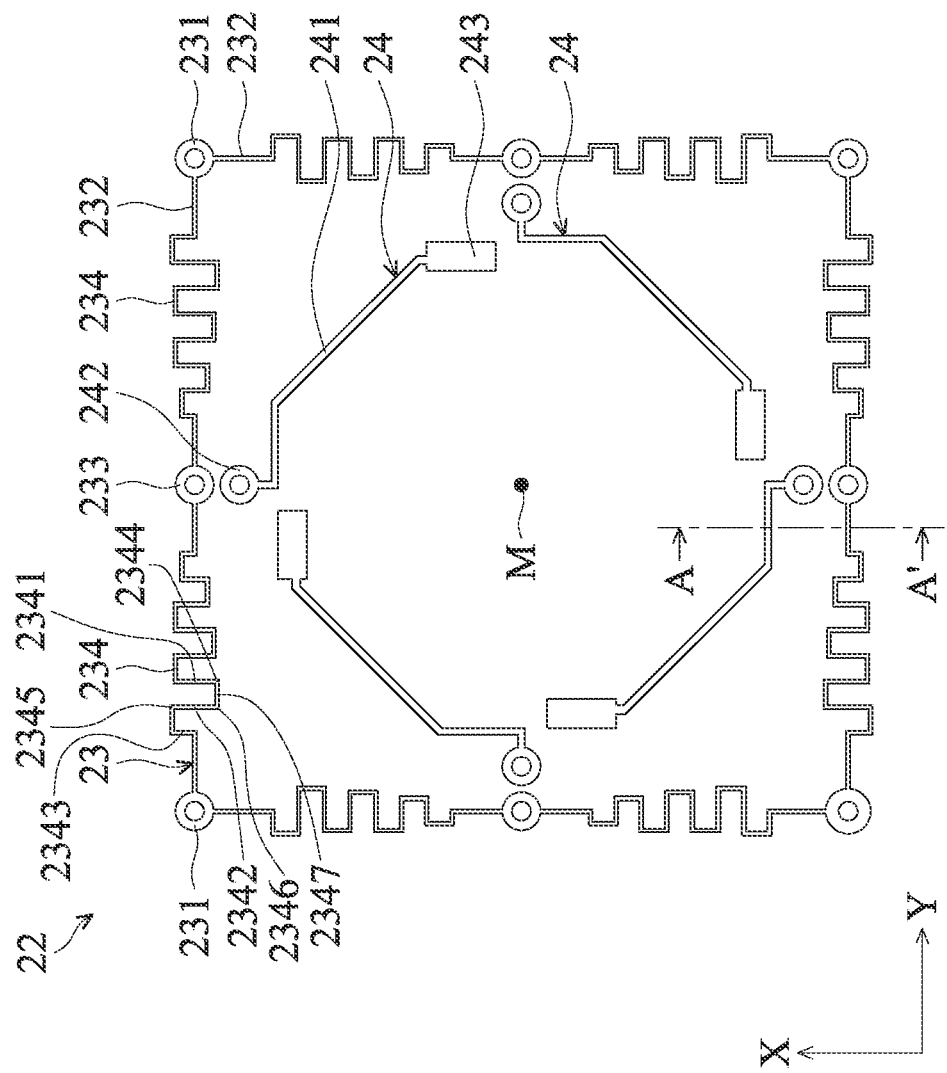
FIG. 2 shows a top view of a first flexible assembly, in accordance with some embodiments of the disclosure.
Figure 3:
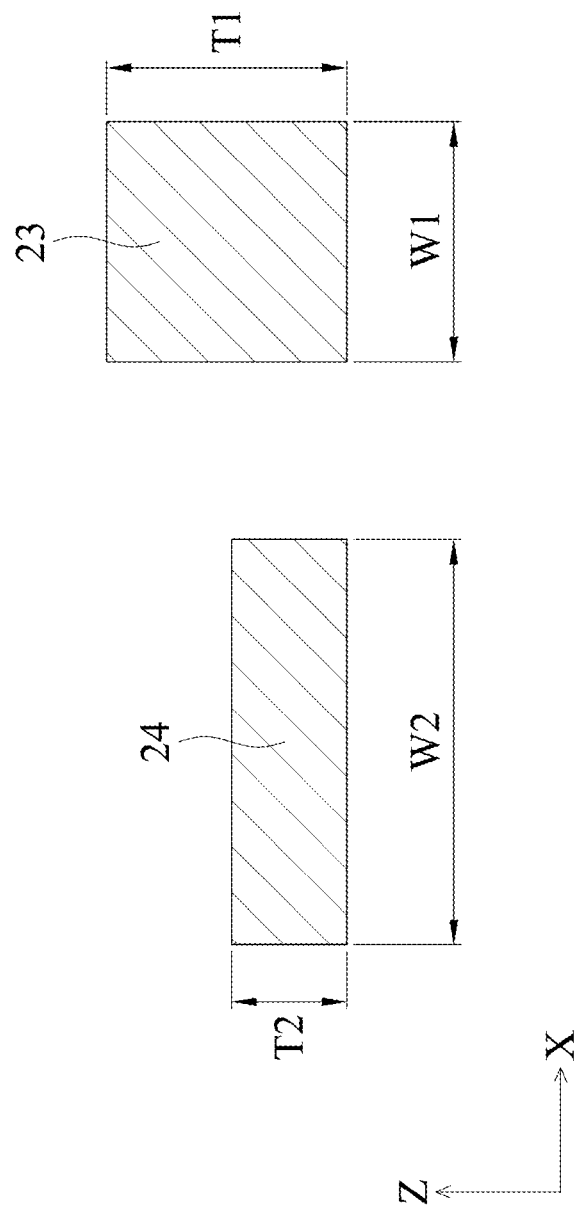
FIG. 3 shows a cross-sectional view taken along line A-A' of FIG. 2.

FIG. 2 shows a top view of the first flexible member 22, in accordance with some embodiments of the disclosure. In some embodiments, the first flexible assembly 22 includes a first outer ring flexible member 23 and one or more first inner ring flexible members 24 (such as four first inner ring flexible member 24). The first outer ring flexible member 23 has a rectangular shape and includes four sub-portions 232 and four connecting portions 231 (first ends 231). The two neighboring sub-portions 232 are perpendicular to each other and connected to the each other by the connecting portion 231. Each of the sub-portions 232 includes a connecting portion 233 (second end 233) and two bended structures 234. The connecting portion 233 is arranged in the center of the sub-portion 232, and the two bended structures 234 are arranged at two sides of the connecting portion 233.

Each of the bended structures 234 can be made by bending a strip-shaped material which has uniform width of W1 and/or a uniform thickness of T1. The width W1 is the dimension of the bended structures 234 of the first outer ring flexible member 23 measured in a direction that is perpendicular to the main axis M. The thickness T1 is the dimension of the bended structures 234 of the first outer ring flexible member 23 measured in a direction that is parallel to the main axis M. In some embodiments, each of the bended structures 234 includes a first segment 2341, a second segment 2342, a third segment 2343, a first bending segment 2344, a second bending segment 2345, a third bending segment 2346, and a middle segment 2347. In some embodiments, the first segment 2341, the second segment 2342, and the third segment 2343 have strip-shaped structures, the first segment 2341 connects to the second segment 2342 through the first bending segment 2344, the third segment 2343 is connected to the second segment 2342 through the second bending segment 2345, and the first bending segment 2344 and the second bending segment 2345 are bent toward different directions. The first segment 2341, the second segment 2342, and the third segment 2343 are substantially parallel to each other. The length of the first segment 2341 is different than the length of the second segment 2342 or the length of the third segment 2343. The first segment 2341 is sequentially connected to the second segment 2342 through the first bending segment 2344, the middle segment 2347 and the third bending segment 2346, and the first segment 2341 and the middle segment 2347 extend to different directions. The length of the first segment 2341 is different than (e.g. greater than) the length of the middle segment 2347.

The four first inner ring flexible members 24 are arranged symmetrically to the main axis M and each includes a main section 241 (inner resilient element 241) and two connecting sections 242 (frame fixing portions 242) and 243 (holder fixing portions 243). The two connecting sections 242 and 243 are connected to two ends of the main section 241. The connecting sections 242 (frame fixing portions 242) are affixed on the frame 20. The connecting sections 243 (holder fixing portions 243) are affixed on the lens holder 27. The holder fixing portion 243 is movably connected to the frame fixing portion 242 through the inner resilient element 241. Each of the main section 241 can be made by bending a strip-shaped material which has a uniform width of W2 and/or a uniform thickness of T2. The width W2 is the dimension of the main section 241 of the first inner ring flexible member 24 measured in the direction that is perpendicular to the main axis M. The thickness T2 is the dimension of the main section 241 of the first inner ring flexible member 24 measured in a direction that is parallel to the main axis M.

It should be noted that while in the embodiment of FIG. 2 the first flexible assembly 22 includes four first inner ring flexible members 24, the number of first inner ring flexible members 24 could be less or greater according to demand. In some other embodiments, the first flexible assembly 22 includes two first inner ring flexible members 24 arranged symmetrically to the main axis M. The two first inner ring flexible members 24 has a length that is greater than that of the first inner ring flexible member 24 shown in FIG. 2. In some other embodiments, the first flexible assembly 22 includes only one circular first inner ring flexible member 24. In some embodiments, the first flexible assembly 22 is omitted. In this case, the electromagnetic driving module may not be able to perform auto focusing.

The first outer ring flexible member 23 and the first inner ring flexible member 24 of the first flexible assembly 22 can be formed independently. Alternatively, the first outer ring flexible member 23 and the first inner ring flexible member 24 of the first flexible assembly 22 are formed integrally. For example, the first outer ring flexible member 23 of the first flexible assembly 22 is connected to (or overlapped with) the connecting sections 242 of the first inner ring flexible member 24.

FIG. 3 shows a cross-sectional view taken along line A-A' of FIG. 2. In some embodiments, as shown in FIG. 3, the width W1 of the first outer ring flexible member 23 is less than the width W2 of the first inner ring flexible member 24, and the thickness T1 of the first outer ring flexible member 23 is greater than the thickness T2 of the first inner ring flexible member 24. However, the disclosure should not be limited to this embodiment. In some embodiments, the width W1 of the first outer ring flexible member 23 is less than the width W2 of the first inner ring flexible member 24, and the thickness T1 of the first outer ring flexible member 23 is equal to the thickness T2 of the first inner ring flexible member 24. In some embodiments, the width W2 of the first inner ring flexible member 24 is greater than the thickness T2 of the first inner ring flexible member 24. In some embodiments, the width W1 of the first outer ring flexible member 23 is less than thickness T1 of the first outer ring flexible member 23. The advantages resulting from the above-mentioned differences in dimensions are described later.

Referring to FIG. 1, in some embodiments, the second flexible assembly 25 includes four second inner ring flexible members 26. Each of the four second inner ring flexible members 26 includes a main section 261 and two connecting sections 262 and 263. The two connecting sections 262 and 263 are connected to two ends of the main sections 261.

Figure 4:
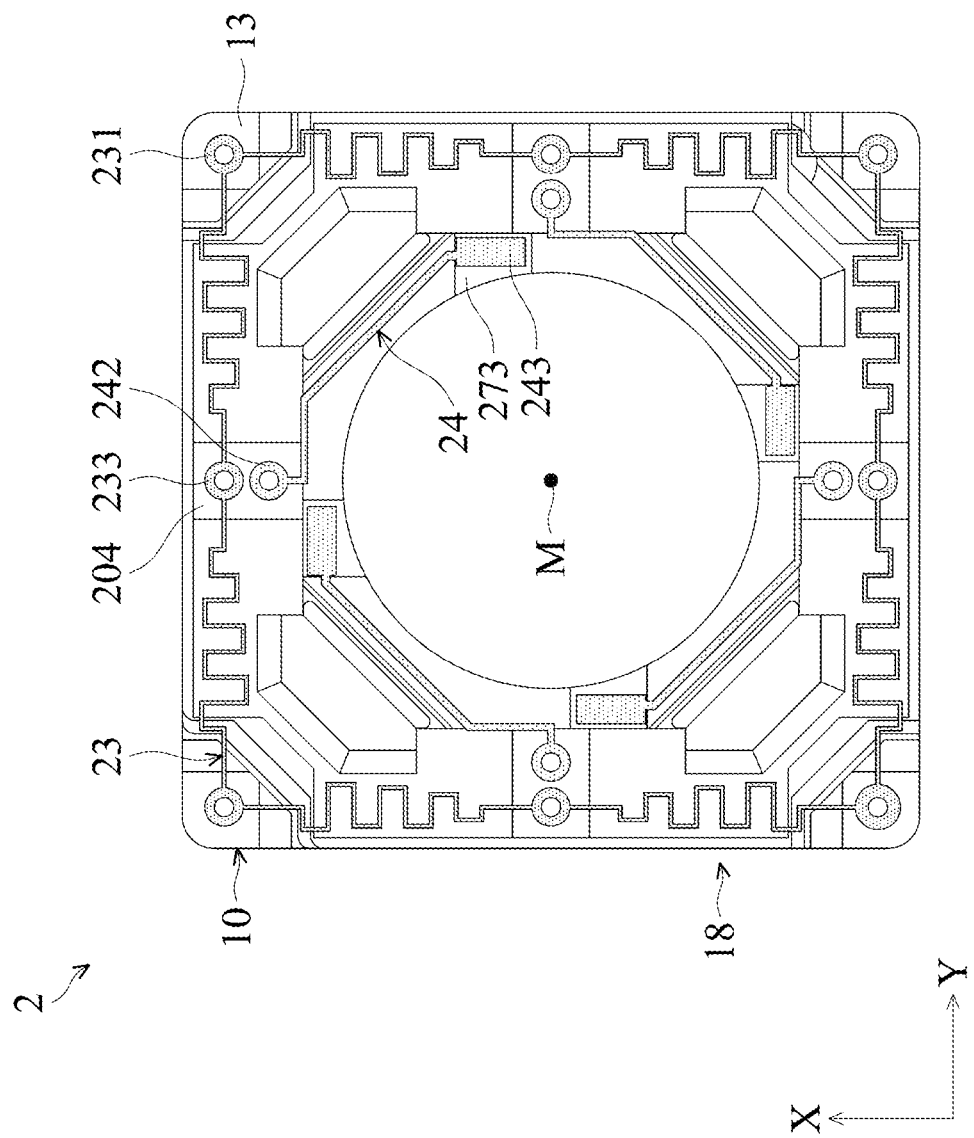
FIG. 4 shows a top view of partial elements of an electromagnetic driving module, in accordance with some embodiments of the disclosure.

FIG. 4 shows a top view of partial elements of the electromagnetic driving module 2, in accordance with some embodiments of the disclosure. When viewed along the main axis M Optical axis M), the fixed portion 10 is polygonal, and has a first side extending in a first direction (e.g. the X direction). After the assembly of the electromagnetic driving module 2, the four connecting portions 231 (fixed portion fixing portion 231) of the first outer ring flexible member 23 are fixed on the four positioning pillars 13 on the fixed portion 10, and the four connecting portions 233 (frame fixing portions 233) are fixed on the four positioning platforms 204 of the movable portion 18. As a result, the movable portion 18 is connected to the fixed portion 10 via the first outer ring flexible member 23 and is able to be moved relative to the fixed portion 10.

On the other hand, the four connecting sections 242 of the first inner ring flexible member 24 are fixed on the four positioning platforms 204, and the four connecting portions 243 are fixed on the four positioning platforms 273. In addition, the four connecting portions 262 of the four second inner ring flexible member 26 (FIG. 1) are fixed on the lower surface of the frame 20, and the four connecting portions 263 of the second inner ring flexible members 26 are fixed on the lower surface of the lens holder 27. As a result, the lens holder 27 is connected to the frame 20 via the first inner ring flexible members 24 and the second inner ring flexible members 26 and is able to be moved relative to the frame 20.

Referring to FIG. 1, when the electromagnetic driving module 2 is in operation, the control module (not shown in figures) transmits electric current to the 01S driving coils 162 and 164. The magnetic force produced between the OIS driving coils 162 and 164 and the magnetic elements 30 causes the movable portion 18 to move in a direction that is perpendicular to the main axis M relative to the fixed portion 10 so as to keep the optical axis of the lens assembly 3 in alignment with the main axis M. In addition, to change the focusing position of the lens assembly, the control module (not shown in figures) transmits electric current to the focusing driving coil 28. Afterwards, the lens holder 27 is moved in the main axis M relative to the fixed portion 10 by the magnetic force produced between the focusing driving coils 28 and the magnetic elements 30.

During the operation of the electromagnetic driving module 2, one or more detection assemblies (not shown in the figures) are used to detect changes in the magnetic field of the focusing magnetic elements 30 and/or the OIS magnetic elements 32 and to give feedback on the position of the movable portion 18 and/or the lens holder 27 relative to the fixed portion 10 to the control module (not shown in the figures) according to the detected result, so as to establish a closed-loop control.

In the above-mentioned embodiments, due to the width W1 of the first outer ring flexible member 23 being less than the width W2 of the first inner ring flexible member 24, the elastic constants of the first outer ring flexible member 23 in the X-axis direction and the Y-axis direction are decreased thereby facilitating the movement of the movable portion 18 relative to the fixed portion 10 in a direction that is perpendicular to the main axis M. In addition, the elastic constants of the first inner ring flexible member 24 in the X-axis direction and the Y-axis direction are increased, and hence the rotation of the lens holder 27 is inhibited.

On the other hand, due to the thickness T1 of the first outer ring flexible member 23 being greater than the thickness T2 of the first inner ring flexible member 24, the elastic constant of the first outer ring flexible member 23 in Z-axis direction is decreased, thereby facilitating the movement of the lens holder 27 relative to the frame in the main axis M.

Figure 5:
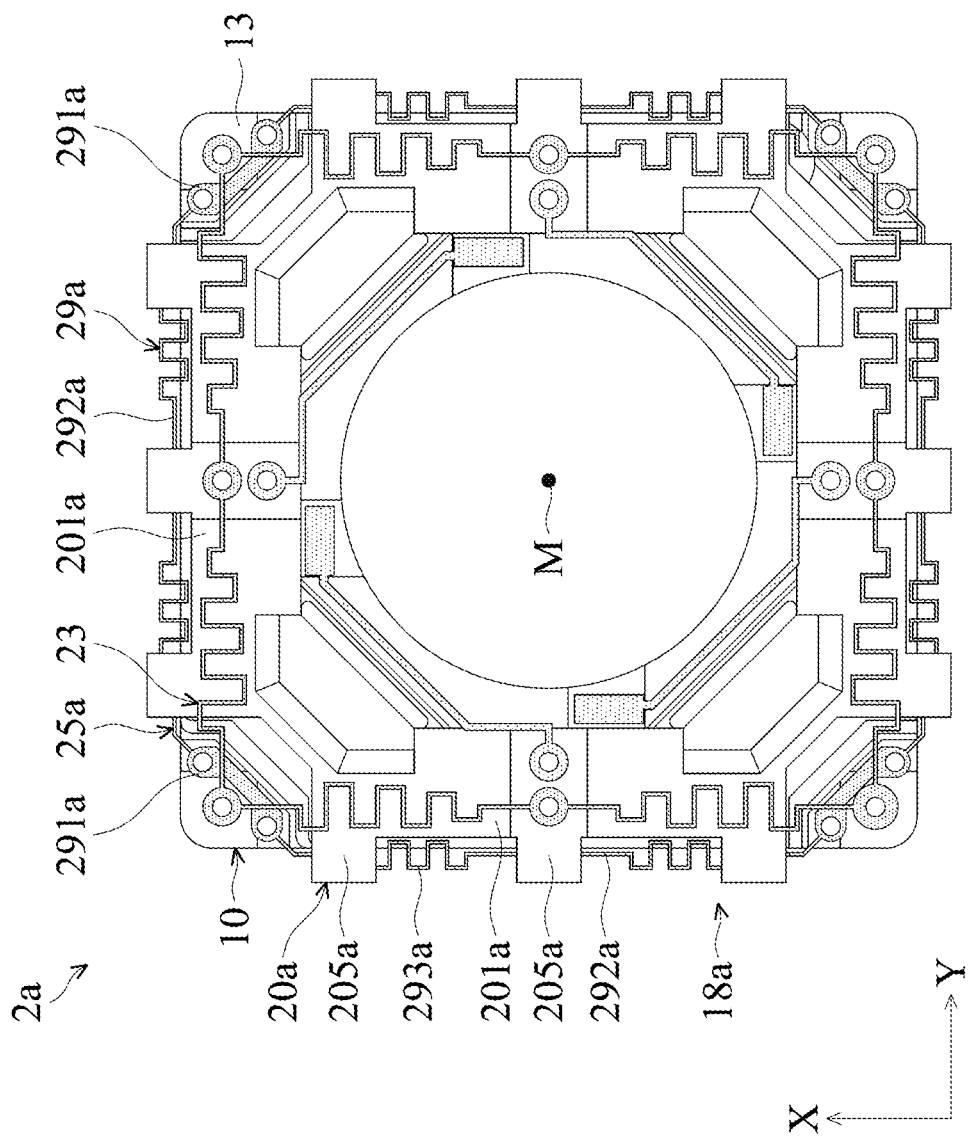
FIG. 5 shows a top view of partial elements of an electromagnetic driving module, in accordance with some embodiments of the disclosure.

FIG. 5 shows a top view of partial elements of an electromagnetic driving module 2a, in accordance with some embodiments of the disclosure. In the embodiments shown in FIG. 5, elements that are similar to those shown in FIG. 4 are provided with the same reference numbers, and the features thereof are not reiterated in the interests of brevity. Differences between the electromagnetic driving module 2 and the electromagnetic driving module 2a include the frame 20 being replaced by a frame 20a and the second flexible assembly 25 being replaced by a second flexible assembly 25a.

In some embodiments, each of the four lateral frame members 201 of the frame 20a includes three protrusions 205a at the outer surface. In addition, the second flexible assembly 25a includes four second inner ring flexible members 26 (FIG. 1) and a second outer ring flexible member 29a. The second outer ring flexible member 29a has a rectangular shape and includes four sub-portions 292a and four connecting portions 291a. The two neighboring sub-portions 292a are perpendicular to each other and are connected to each other by the connecting portion 291a. Each of the sub-portions 292a includes a bended structure 293a.

Figure 6:
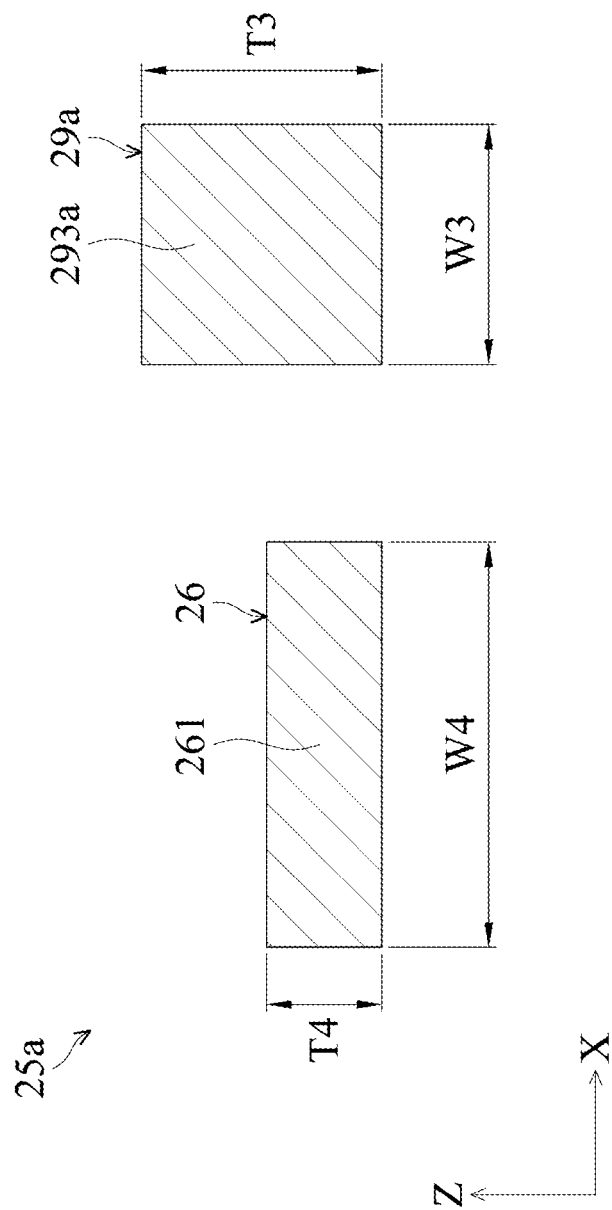
FIG. 6 shows a cross-sectional view of a second flexible member, in accordance with some embodiments of the disclosure.

FIG. 6 shows a cross-sectional view of a second flexible assembly 25a, in accordance with some embodiments of the disclosure. In some embodiments, each of the bended structures 293a can be made by bending a strip-shaped material which has a uniform width of W3 and/or a uniform thickness of T3. The width W3 is the dimension of the bended structures 293a of the second outer ring flexible member 29a measured in a direction that is perpendicular to the main axis M. The thickness T3 is the dimension of the bended structures 293a of the second outer ring flexible member 29a measured in a direction that is parallel to the main axis M.

Each of the main sections 261 can be made by bending a strip-shaped material which has a uniform width of W4 and/or a uniform thickness of T4. The width W4 is the dimension of the main section 261 of the second inner ring flexible member 26 measured in a direction that is perpendicular to the main axis M. The thickness T4 is the dimension of the main section 261 of the first inner ring flexible member 26 measured in a direction that is parallel to the main axis M.

In some embodiments, the width W3 of the second outer ring flexible member 29a is less than the width W4 of the second inner ring flexible member 26 (FIG. 1), and the thickness T3 of the second outer ring flexible member 29a is equal to the thickness T4 of the second inner ring flexible member 26. However, the disclosure should not be limited to this embodiment. In some embodiments, the width W3 of the second outer ring flexible member 29a is less than the width W4 of the second inner ring flexible member 26, and the thickness T3 of the second outer ring flexible member 29a is greater than the thickness T4 of the second inner ring flexible member 26. In some embodiments, the width W4 of the second inner ring flexible member 26 is greater than the thickness T4 of the second inner ring flexible member 26. In some embodiments, the width W3 of the second outer ring flexible member 29a is less than the thickness T3 of the second outer ring flexible member 29a.

After the assembly of the electromagnetic driving module 2a, the four connecting portions 291a of the second outer ring flexible member 29a are fixed on the four positioning pillars 13 on the fixed portion 10, and the four sub-portions 292a are fixed on the protrusions 205a of the movable portion 18a. As a result, the frame 20a of the movable portion 18a is connected to the positioning pillars 13 of the fixed portion 10 via the first outer ring flexible member 23 and the second outer ring flexible member 29a and is able to be moved relative to the fixed portion 10. In the embodiment, with the arrangements of the second flexible assembly 25a, a large posture difference of the movable portion 18a caused by gravity can be prevented.

Embodiments of the electromagnetic driving module in the disclosure use a flat flexible member to connect the movable portion to the fixed portion so as to facilitate the movement of the movable portion relative to the fixed portion. Since the flexible member has a smaller elastic constant than that of the conventional suspension wire in the direction along which the movable portion is operated to move, the moving distance of the movable portion is increased. Additionally, due to the omission of the suspension wires, the thickness of the electromagnetic driving module is reduced, whereby the electromagnetic driving module can be applied to end products which are relatively thin. Moreover, with a smaller elastic constant of the flexible member, the power consumption of the electromagnetic driving module is reduced.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed portion;
a movable portion movably connected to the fixed portion and comprises a frame and a holder, wherein an optical element having an optical axis is connected to the movable portion, when viewed along the optical axis, the fixed portion is polygonal, and has a first side extending in a first direction;
a first driving assembly used for driving the movable portion to perform a translational movement relative to the fixed portion in a direction that is perpendicular to the optical axis, wherein the first driving assembly comprises:
a first magnetic element disposed on the movable portion; and
a first coil disposed on the movable portion;
a resilient element, comprising:
a fixed portion fixing portion affixed on the fixed portion;
a frame fixing portion affixed on the frame;
a holder fixing portion affixed on the holder;
an outer resilient element, wherein the frame fixing portion is movably connected to the fixed portion fixing portion through the outer resilient element, and the outer resilient element comprises:
a first segment having a strip-shaped structure;
a second segment having a strip-shaped structure;
a first bending segment, wherein the first segment connects to the second segment through the first bending segment, and the frame is movably connected to the fixed portion through the outer resilient element;
a third segment having a strip-shaped structure; and
a second bending segment, wherein:
the third segment is connected to the second segment through the second bending segment;
the first bending segment and the second bending segment bent in different directions; and
an inner resilient element, wherein the holder fixing portion is movably connected to the frame fixing portion through the inner resilient element, and the holder is movably connected to the frame through the inner resilient element.

2. The optical element driving mechanism as claimed in claim 1, wherein the first segment is substantially parallel to the third segment.

3. The optical element driving mechanism as claimed in claim 2, wherein the second segment is substantially parallel to the third segment.

4. The optical element driving mechanism as claimed in claim 2, wherein a length of the first segment is different than a length of the third segment.

5. The optical element driving mechanism as claimed in claim 1, wherein the first segment is substantially parallel to the second segment.

6. The optical element driving mechanism as claimed in claim 5, wherein a length of the first segment is different than a length of the second segment.

7. The optical element driving mechanism as claimed in claim 1, wherein the outer resilient element has an outer resilient element section parallel to the optical axis, and a size of the outer resilient element section in a direction that is parallel to the optical axis is greater than or equal to a size of the outer resilient element section in a direction that is perpendicular to the optical axis.

8. The optical element driving mechanism as claimed in claim 7, wherein the inner resilient element has an inner resilient element section parallel to the optical axis, and a size of the inner resilient element section in a direction that is parallel to the optical axis is less than or equal to a size of the inner resilient element section in a direction that is perpendicular to the optical axis.

9. The optical element driving mechanism as claimed in claim 1, wherein the inner resilient element is closer to the optical axis than the outer resilient element.

10. The optical element driving mechanism as claimed in claim 1, wherein the fixed portion fixing portion has a first surface, the frame fixing portion has a second surface, and the first surface is parallel to the second surface.

11. The optical element driving mechanism as claimed in claim 10, wherein the first surface and the second surface are not parallel to the optical axis.

12. The optical element driving mechanism as claimed in claim 1, wherein the outer resilient element further comprises a middle segment and a third bending segment, the first segment is sequentially connected to the second segment through the first bending segment, the middle segment and the third bending segment, and the first segment and the middle segment extend to different directions.

13. The optical element driving mechanism as claimed in claim 12, wherein a length of the first segment is different than a length of the middle segment.

14. The optical element driving mechanism as claimed in claim 13, wherein the length of the first segment is greater than the length of the middle segment.

15. The optical element driving mechanism as claimed in claim 1, wherein the fixed portion comprises:
a case, comprising:
a top plate that is not parallel to the optical axis; and
a sidewall extended from an edge of the top plate along the optical axis; and
a bottom, comprising:
a bottom plate; and
a column extended from the bottom plate to the top plate, wherein the outer resilient element comprises a first end fixed to the column.

16. The optical element driving mechanism as claimed in claim 15, wherein the first end has an opening, and the column further comprises a projection passing through the opening.

17. The optical element driving mechanism as claimed in claim 1, further comprising a second driving assembly disposed in the fixed portion to move the holder relative to the frame.

18. The optical element driving mechanism as claimed in claim 16, wherein the second driving assembly further comprises a second driving magnetic element, the optical element driving mechanism has a polygonal shape, and the second driving magnetic element is disposed on a corner of the optical element driving mechanism.

* * * * *